(12) United States Patent
Kime

(10) Patent No.: US 7,979,409 B2
(45) Date of Patent: *Jul. 12, 2011

(54) METHOD AND SYSTEM FOR CHECKING AVAILABILITY OF AUTOMOUNTED FILE SYSTEMS

(75) Inventor: Christopher Frank Kime, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 413 days.

This patent is subject to a terminal disclaimer.

(21) Appl. No.: 12/181,932

(22) Filed: Jul. 29, 2008

(65) Prior Publication Data

US 2008/0281774 A1 Nov. 13, 2008

Related U.S. Application Data

(63) Continuation of application No. 10/870,523, filed on Jun. 17, 2004, now Pat. No. 7,444,359.

(51) Int. Cl.
 *G06F 17/30* (2006.01)
(52) U.S. Cl. .................. 707/705; 707/831
(58) Field of Classification Search .................. 707/705, 707/831
 See application file for complete search history.

(56) References Cited

U.S. PATENT DOCUMENTS

| 5,175,852 | A | 12/1992 | Johnson et al. |
| 5,469,560 | A | 11/1995 | Beglin |
| 5,778,384 | A | 7/1998 | Provino et al. |
| 2003/0177107 | A1 | 9/2003 | Brown et al. |

OTHER PUBLICATIONS

David Mazieres, A toolkit for user-level file systems, Jun. 2001, scs.stanford.edu.*
USPTO office action for U.S. Appl. No. 10/870,523 dated Nov. 30, 2006.
USPTO final office action for U.S. Appl. No. 10/870,523 dated May 1, 2007.
USPTO office action for U.S. Appl. No. 10/870,523 dated Oct. 17, 2007.
USPTO Notice of allowance for U.S. Appl. No. 10/870,523 dated May 15, 2008.

* cited by examiner

*Primary Examiner* — John Breene
*Assistant Examiner* — Thu-Nguyet Le
(74) *Attorney, Agent, or Firm* — Yee & Associates, P.C.; Libby Z. Toub

(57) ABSTRACT

A method, an apparatus, a system, and a computer program product are presented for determining whether a file system, which contains a file system resource that is to be the target of a file system operation, is currently mounted by a data processing system. A first kernel-level process obtains unique identifying information for a file system that contains the target file system resource, and a second kernel-level process manages a data structure having an entry for each file system that the kernel of the data processing system recognizes as being currently mounted. The data structure is searched by the first kernel-level process for an entry having information that matches the unique identifying information such that the first kernel-level process determines that the file system is mounted in response to finding an entry having information that matches the unique identifying information.

8 Claims, 11 Drawing Sheets

METHOD AND SYSTEM FOR CHECKING AVAILABILITY OF AUTOMOUNTED FILE SYSTEMS

CROSS-REFERENCE TO RELATED APPLICATIONS

The present application is related to the following application with a common assignee:

U.S. patent application Ser. No. 10/870,539, filed Jun. 17, 2004, titled "Method and System for Identifying Automounted File System Resources", issued as U.S. Pat. No. 7,428,556.

This application is a continuation of application Ser. No. 10/870,523, filed Jun. 17, 2004, status allowed.

BACKGROUND OF THE INVENTION

1. Field of the Invention

The present invention relates to an improved data processing system and, in particular, to a method and apparatus for file system management.

2. Description of Related Art

Computer systems typically contain one or more massive direct access storage devices for persistently storing data, such as hard drives. While a storage device provides capacity for physical storage, related data is logically stored within these devices in the form of files. A file acts as a logical container for manipulating an amount of data as a larger, discrete unit. An operating system organizes files within a file system. The file system comprises logical associations between file system resources, e.g., files, volumes, directories, folders, the latter three of which act as containers for files; in addition, a file system resource may comprise an entire file system such that an entire remote file system becomes logically associated with a local file system. These logical associations are stored in data structures that are typically also stored within the same storage device.

Distributed data processing systems comprise multiple computational devices that communicate in some manner, e.g., on a common network. File systems have been enhanced to permit file sharing throughout a network, even though those files may be stored on storage devices that are controlled by disparate computational devices. In so doing, processes that are local to a particular computational device may access files that are physically stored on remote devices.

File system resources are shared in an explicit manner, thereby allowing a local file system to have some degree of control over which remote file system resources are available to its local processes. For example, a first file system may explicitly export a file system resource, e.g., a project directory, and a second file system may explicitly import the file system resource from the first file system. In this manner, a permission mechanism is established; a file system allows its file system resources to be accessed by another file system, and another file system allows its file system to access file system resources in a foreign file system.

In addition to permitting the sharing of a file system resource, a file system needs to manage a logical association between its local file system and the remote file system resource that is being accessed by its local processes. The sharing of file system resources may entail static, logical associations in persistent data structures, e.g., within system configuration files; it may also entail dynamically created, logical associations using data structures in volatile memory, or some combination of the two. The logical associations may be implemented using pathnames, namespaces, or other logical schemes.

In any case, the logical association provides a mechanism for a local file system to incorporate the remote file system resource into the data structures that the local file system uses to manage available file system resources. These logical associations between a local file system and a remote file system resource are created or destroyed through mount/unmount operations that are also used for local system resources; the creation of a logical association with a file system resource is termed a mount operation, and the destruction of the logical association is termed an unmount operation.

Some operating systems provide for the automatic mounting and unmounting of file system resources in an on-demand fashion or in an as-needed fashion; such file system resources are usually described as automount file system resources. An operating system employs an automount program, also referred to as an automount daemon or simply an automounter, to perform the operations that are necessary for mounting and unmounting automount file system resources, which are sometimes collectively referred to as automounting operations. When necessary, e.g., upon a request operation, a file system resource is automatically mounted on-demand to access the file system resource; file system resources are automatically unmounted due to inactivity or for other considerations, such as changes in file system configuration by a system administrator. While it may be convenient for an operating system to implement an automount feature for certain file system resources, the automount feature may be problematic in some instances.

For example, an operating system is typically organized such that a set of software modules at the kernel level within the operating system is responsible for implementing file-related operations; these software modules may be termed file subsystem modules. For expediency of description, any other kernel level modules other than the file subsystem modules can be grouped together, herein termed non-file-subsystem modules. When necessary, the non-file-subsystem modules may employ the file subsystem modules to access files or merely to obtain file-related information, i.e. metadata about files.

A problem may arise because a non-file-subsystem module may attempt to obtain file metadata about an unmounted automount file system resource without needing to access the automount file system resource. In order to obtain the file metadata information, a non-file-subsystem module may use certain functions that are implemented within file subsystem modules. In this situation, a file subsystem module would not need to mount the unmounted automount file system resource because the non-file-subsystem module does not need to access the automount file system resource. However, due to the nature of its code, a file subsystem module still attempts to mount the unmounted automount file system resource. Hence, even though the unmounted automount file system resource did not need to be mounted, the non-file-subsystem module can inadvertently cause an attempt to mount the unmounted automount file system resource. In some instances, the attempt to mount the unmounted automount file system resource may result in a severe error. In other instances, depending on the frequency of the actions by the non-file-subsystem module, its actions may have the unintended consequence of effectively maintaining an automount file system resource in a mounted state, thereby negating the benefits that are provided by the automount characteristic.

Although most operating systems implement one or more functions via a file subsystem module for determining whether a file system resource is an automount file system resource or for determining whether an automounted file system resource is mounted, these functions are typically only available to software modules at the application level, which are being supported by the kernel modules; in other words, these functions are not available to non-file-subsystem modules at the kernel level. Moreover, certain file metadata that is readily available to non-file-subsystem modules often does not contain any indications about whether a file system resource is an automount file system resource or whether an automounted file system resource is mounted.

Therefore, it would be advantageous to have a method and system for determining whether an automounted file system resource is mounted.

SUMMARY OF THE INVENTION

A method, an apparatus, a system, and a computer program product are presented for determining whether a file system, which contains a file system resource that is to be the target of a file system operation, is currently mounted by a data processing system. A first kernel-level process obtains unique identifying information for a file system that contains the target file system resource, and a second kernel-level process manages a data structure having an entry for each file system that the kernel of the data processing system recognizes as being currently mounted. The data structure is searched by the first kernel-level process for an entry having information that matches the unique identifying information such that the first kernel-level process determines that the file system is mounted in response to finding an entry having information that matches the unique identifying information.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
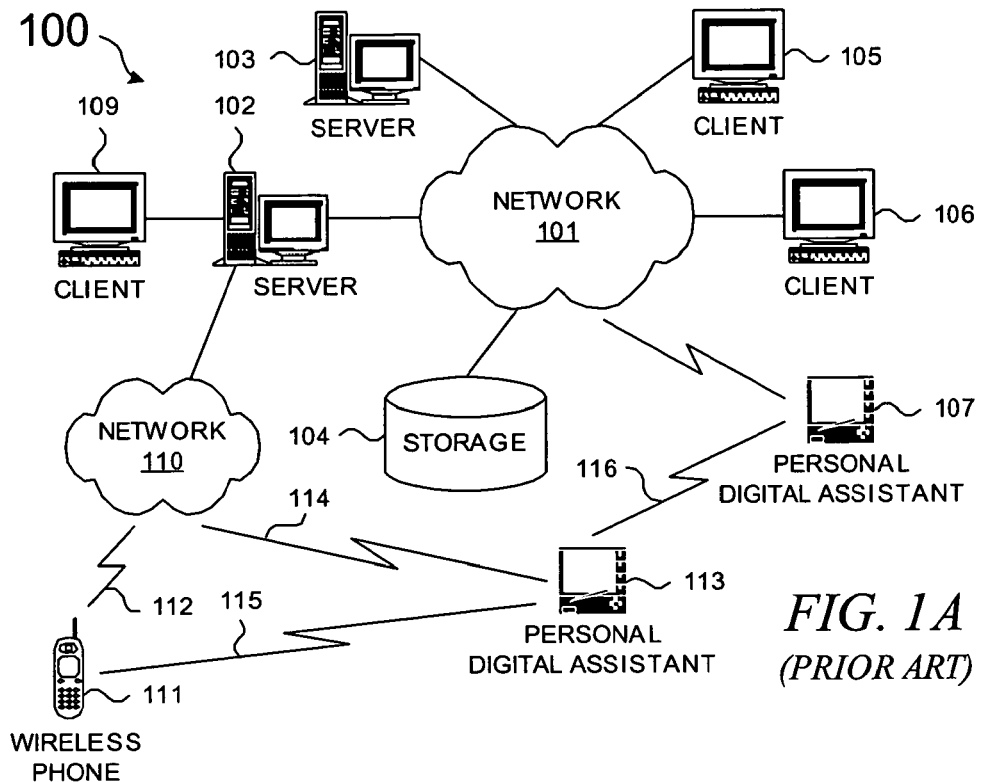
FIG. 1A depicts a typical network of data processing systems, each of which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless link 116.

The present invention could be implemented on a variety of hardware platforms; FIG. 1A is intended as an example of a heterogeneous computing environment and not as an architectural limitation for the present invention.

Figure 1B:
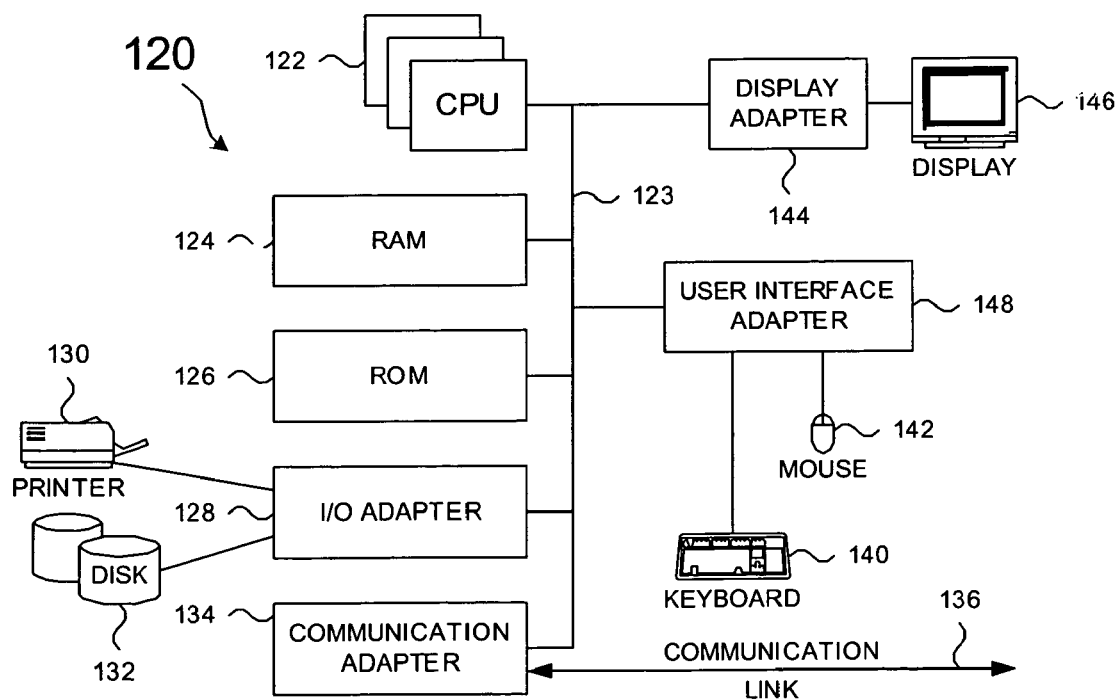
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment.

The present invention may be implemented on a variety of hardware and software platforms, as described above with respect to FIG. 1A and FIG. 1B. More specifically, though, the present invention is directed to improved processing with respect to automounted file system resources. Before describing the present invention in more detail, though, some background information about file systems is provided for evaluating the operational efficiencies and other advantages of the present invention.

Figure 2:
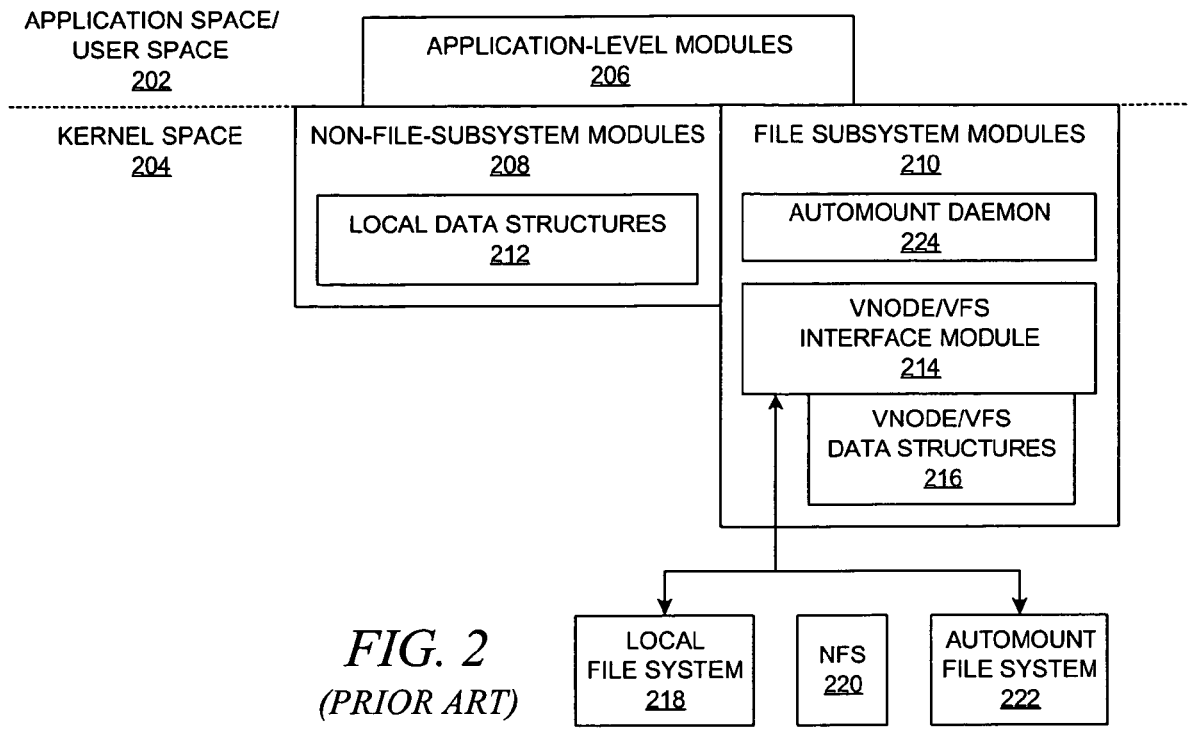
FIG. 2 depicts a block diagram that shows a typical logical organization of software modules and associated data structures for managing file systems from within a data processing system.

With reference now to FIG. 2, a block diagram depicts a typical logical organization of software modules and associated data structures for managing file systems from within a data processing system. A processing space is logically divided into application space or user space 202 and kernel space 204. Application space 202 contains application-level modules 206, which include applications that are executing at the request of a user. Kernel-space 204 contains kernel-level modules that are executing as part of the operating system kernel or with kernel-level privileges. Application-level modules 206 execute in accordance with user-level privileges that restrict the operations that are available for use so that an application-level module cannot gain improper control of a data processing system, thereby ensuring that an application-level module cannot reconfigure the data processing system in a manner that would be undesirable for a system administrator. Application-level modules 206 may request that kernel-level modules perform certain operations via system calls; the kernel-level modules are able to determine whether to perform the operation that is associated with a system call in accordance with the execution privileges that are associated with the requesting application-level module and/or user privileges that are associated with the user that has initiated the execution of the requesting application-level module.

In order to facilitate the description herein of certain processes within kernel space 204, the modules that execute within kernel space 204 have been logically divided into non-file-subsystem modules 208 and file subsystem modules 210. Non-file-subsystem modules 208, which include local data structures 212 for a variety of purposes, depend upon file subsystem modules 210 for performing operations with respect to file system resources.

File subsystem modules 210 manage file system resources via Vnode/VFS (Virtual File System) interface modules 214, as is typical in the Unix™ operating system or in Unix™-like operating system variants, e.g., Solaris™, Linux™, and others. Vnode/VFS interface modules 214 employ vnode/vfs data structures 216 to manage a variety of file systems, such as local file system 218, network file system (NFS) 220, automount file system 222, and/or other types of file systems. File subsystem modules 210 also include automount daemon 224, also known as an automount program or an automounter.

Figure 3:
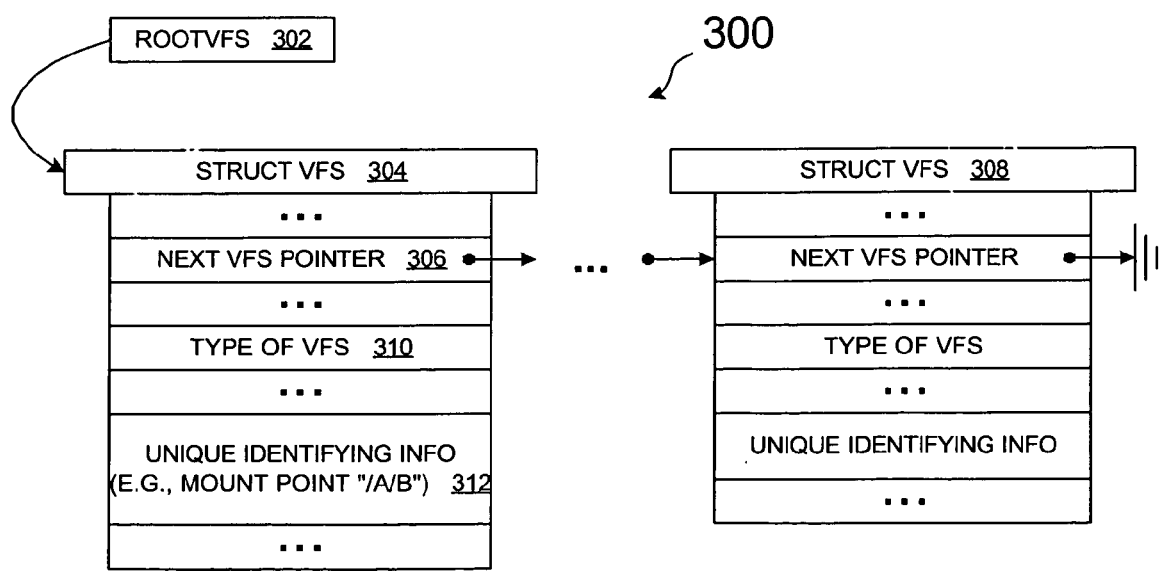
FIG. 3 depicts a block diagram that shows a typical linked list of VFS data structures that are used to manage file systems.

With reference now to FIG. 3, a block diagram depicts a typical linked list of VFS data structures that are used to manage file systems. FIG. 3 provides more detail for vnode/VFS data structures 216 that are shown in FIG. 2. The vnode/VFS interface is a kernel-level interface that has been widely adopted to support multiple file systems in an extensible manner. Newly developed file system can be supported with pluggable file system modules that adhere to the vnode/VFS interface. The VFS portion of the interface supports operations with respect to a file system, while the vnode portion of the interface supports operations with respect to a virtual file.

Linked list 300 is one of vnode/VFS data structures 216 that is shown in FIG. 2. As a file system is mounted, an item is added to linked list 300 to represent the newly mounted file system. As a file system is unmounted, its representation within linked list 300 is removed from linked list 300.

RootVFS pointer 302 points to the head of linked list 300; in this example, the head of linked list 300 is VFS data structure 304. Each item in linked list 300 is a VFS data structure that contains information about a mounted file system. Each item in linked list 300 points to the next item in linked list 300, e.g., using next item pointer 306, until the tail of the linked list is identified, which is VFS data structure 308 in this example. Each VFS data structure contains file system type value 310, which is a data value that indicates the type of file system that is being represented by the including VFS data structure, e.g., local file system, NFS, automounted file system, or some other type of file system. Each VFS data structure also contains unique identifying information for the represented file system; in this example, mount point identifier 312 is a pointer to a vnode on which the represented file system is mounted, i.e. the mount point, which might be represented in the application space using path name "/a/b". Although mount point identifier 312 may be used as a unique identifier for the represented file system, a different data item may be used to uniquely identify the represented file system in different systems.

Figure 4:
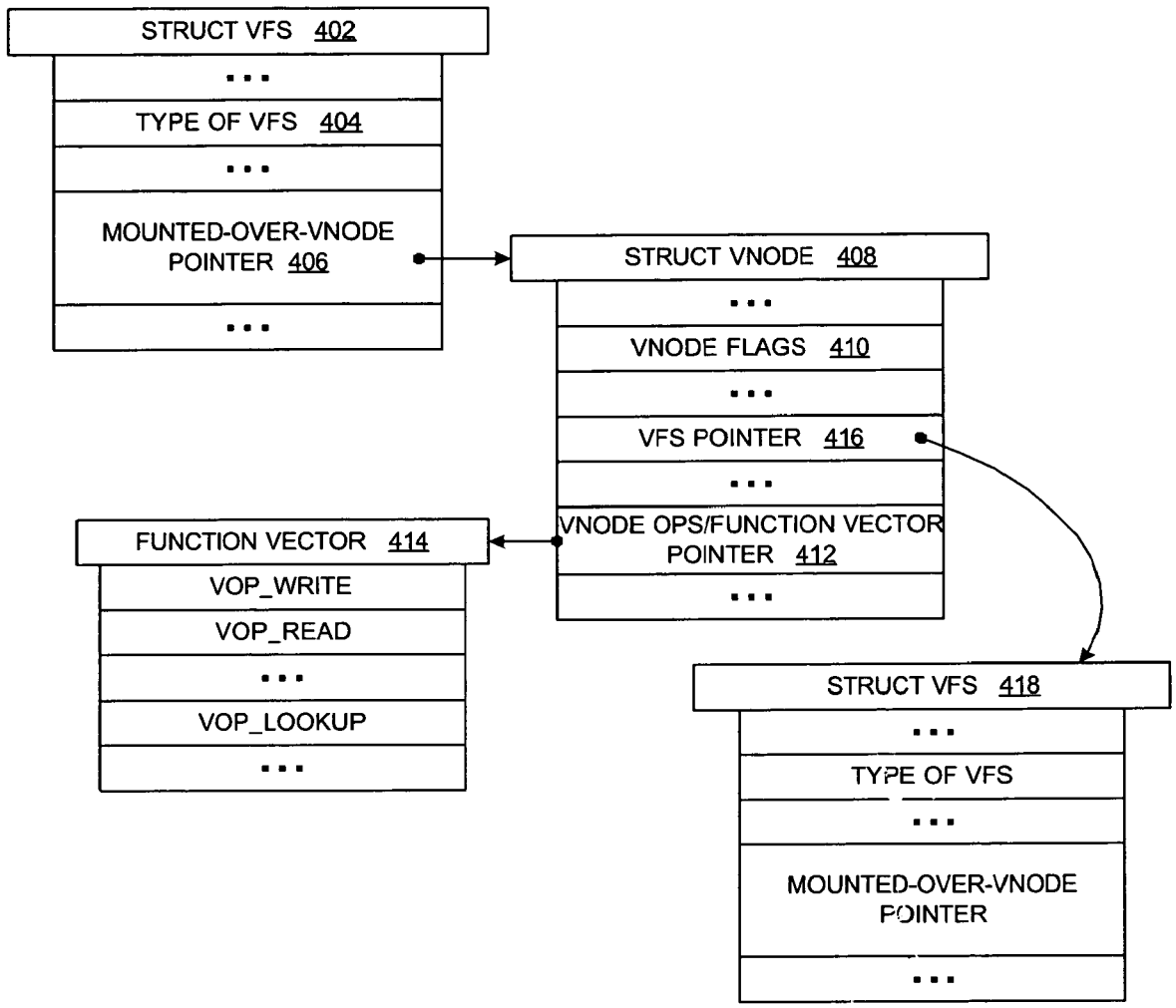
FIG. 4 depicts a block diagram that shows some typical data structures that are employed to represent virtual file in a vnode/VFS interface.
Figure 5:
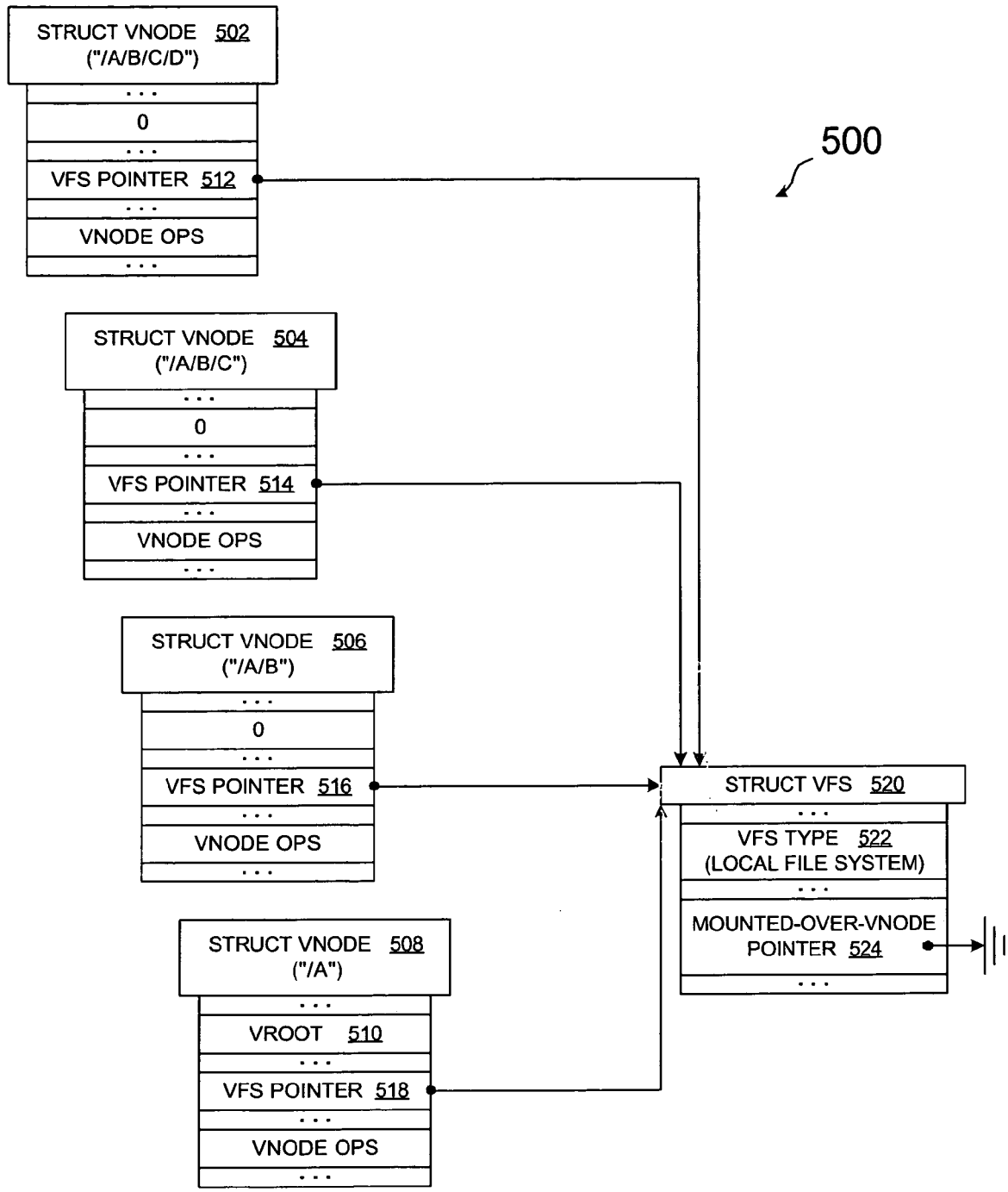
FIG. 5 depicts a block diagram that shows an example of a typical use of vnode/VFS data structures to represent a set of files.
Figure 6A:
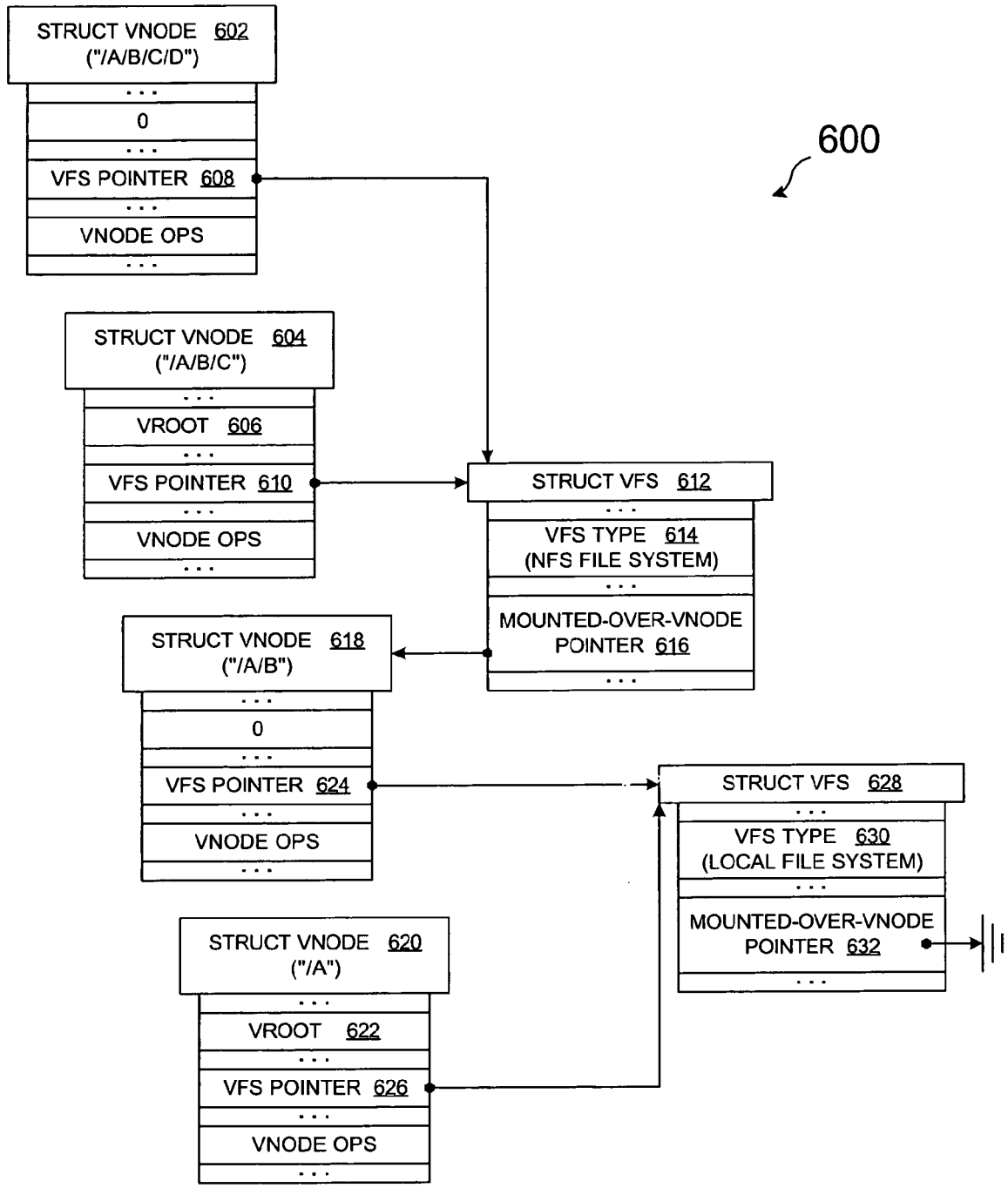
FIG. 6A depicts a block diagram that shows an example of a typical use of vnode/VFS data structures to represent a set of files that includes an NFS file system that is mounted within a local file system.
Figure 6B:
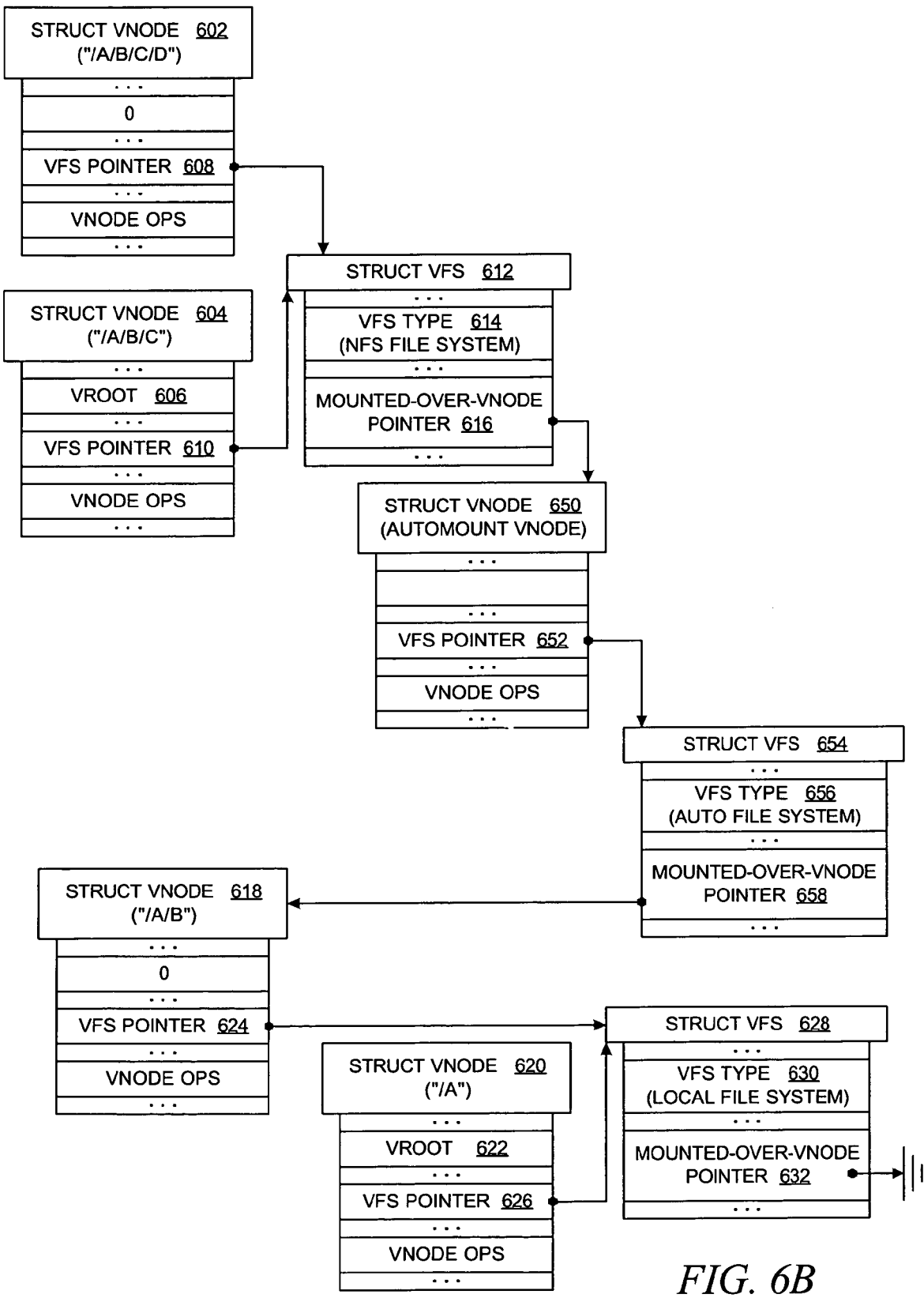
FIG. 6B depicts a block diagram that shows an example of a typical use of vnode/VFS data structures to represent a set of files that includes an NFS file system that is automounted within a local file system.

With reference now to FIG. 4, a block diagram depicts some typical data structures that are employed to represent virtual files in a vnode/VFS interface. FIG. 4 along with FIG. 3 provides more detail for vnode/VFS data structures 216 that are shown in FIG. 2. A VFS data structure represents each file system that has been mounted, and a vnode data structure represents each open or in-use virtual file, which may include data files, directories, logical devices, physical devices, data pipes, etc. A type of tree data structure is formed by the vnode data structures, the VFS data structures, and the reference pointers between the constituent data structures. An instance of a data processing system with many open files in many different directories and file system may result in an internal tree data structure that reflects the logical directory structure of the various file systems, as in the examples that are shown in FIGS. 5, 6A, and 6B.

In a manner discussed above with respect to FIG. 3, VFS data structure 402 represents a mounted file system. Each VFS data structure contains file system type value 404, which is a data value that indicates the type of file system that is being represented by the including VFS data structure. Mounted-over-vnode pointer 406 is a pointer to a vnode on which the represented file system is mounted, i.e. the mount point of the represented file system.

Vnode data structure 408 represents an open virtual file. Vnode flags 410 are data flag values that indicate various characteristics of the represented virtual file, such as whether the vnode is the root of its file system, whether the vnode is locked, whether the vnode is restricted to read-only operations, and various other characteristics. Vnode operations/function vector pointer 412 points to function vector table 414, which holds pointers to functions that are invoked for operations on the file that is represented by a vnode instance, such as a write operation, a read operation, a lookup operation, or some other operation. VFS pointer 416 points to VFS data structure 418, which represents the mounted file system that contains the vnode, i.e. the parent file system for the virtual file.

Given the tree data structure that is managed by the vnode/VFS interface, information about file system resources can be managed such that it can be efficiently searched when a file system resource is accessed. On a data processing system that is running the UNIX™ operating system, any given file system resource can be uniquely identified by using a file identifier that is associated with the file system resource, a file identifier that is associated with the containing directory of the file system resource, and a number which identifies the file system in which the file system resource is located. This triplet of numbers can be retrieved from the vnode data structure that has been created for the file system resource and the vnode data structure of its containing directory. A vnode is retrieved using a lookup operation that accepts a file pathname for the file system resource as an input parameter. The vnode of a file system resource can be used to lookup the vnode of its containing directory using the lookup operation that can be identified within the function vector table that is associated with the vnode.

With reference now to FIG. 5, a block diagram depicts an example of a typical use of vnode/VFS data structures to represent a set of files. In this example, a set of open files in the file pathname of "/a/b/c/d" are represented by data structure 500: the data file with pathname "/a/b/c/d" is represented by vnode data structure 502; the data file with pathname "/a/b/c" is represented by vnode data structure 504; the data file with pathname "/a/b" is represented by vnode data structure 506; and the data file with pathname "/a" is represented by vnode data structure 508. Vnode data structure 508 is identified as the root of the file system with VROOT indicator 510. Vnodes 502-508 have VFS pointers 512-518, respectively, that point to VFS data structure 520, which is identified as a local file system by type value 522; mounted-over-vnode pointer 524 indicates that VFS data structure 520 is not included within another parent file system.

In the example that is shown in FIG. 5, starting with the file pathname of "/a/b/c/d", a lookup operation on the parent directory, which is often represented by the string " . . . ", of the vnode for "/a/b/c/d" returns the vnode for "/a/b/c". A lookup operation on the parent directory of the vnode for "/a/b/c" returns the vnode of "/a/b", and a lookup operation on the parent directory of the vnode for "/a/b" returns the vnode of "/a", which is indicated as being a root node of the local file system.

With reference now to FIG. 6A, a block diagram depicts an example of a typical use of vnode/VFS data structures to represent a set of files which includes an NFS file system that is mounted within a local file system. In this example, a set of open files in the file pathname of "/a/b/c/d" are represented by data structure 600; the data file with pathname "/a/b/c/d" is represented by vnode data structure 602, and the data file with pathname "/a/b/c" is represented by vnode data structure 604. Vnode data structure 604 is identified as the root of the file system with VROOT indicator 606. Vnodes 602 and 604 have VFS pointers 608 and 610 that point to VFS data structure 612, which is identified as an NFS file system by type value 614. Mounted-over-vnode pointer 616 for VFS data structure 612 indicates that the represented NFS file system is included within another parent file system, and its mount point is the "/a/b" vnode. In other words, a file system that supports "/c/d" is mounted onto the file system that support "/a/b".

The data file with pathname "/a/b" is represented by vnode data structure 618, and the data file with pathname "/a" is represented by vnode data structure 620. Vnode data structure 620 is identified as the root of the file system with VROOT indicator 622. Vnodes 618 and 620 have VFS pointers 624 and 626, respectively, that point to VFS data structure 628, which is identified as a local file system by type value 630. Mounted-over-vnode pointer 632 for VFS data structure 628 indicates that the represented local file system is not included within another parent file system.

In a manner similar to that described above with respect to FIG. 5, a lookup operation on the parent directory of the vnode for "/a/b/c/d" in FIG. 6A also returns the vnode for "/a/b/c". A lookup operation on the parent directory of the vnode for "/a/b/c" returns the vnode of "/a/b", and a lookup operation on the parent directory of the vnode for "/a/b" returns the vnode of "/a", which is indicated as being a root node of the local file system. However, in FIG. 6A, the vnode for "/a/b/c" indicates that it is a root node of a file system, and the type of file system that includes vnodes 602 and 604 can be discovered with reference to VFS data structure 612.

With reference now to FIG. 6B, a block diagram depicts an example of a typical use of vnode/VFS data structures to represent a set of files which includes an NFS file system that is automounted within a local file system. FIG. 6B is similar to FIG. 6A; similar reference numerals refer to similar elements. In a manner similar to that described above with respect to FIG. 6A, a lookup operation on the parent directory of the vnode for "/a/b/c/d" in FIG. 6B also returns the vnode for "/a/b/c". A lookup operation on the parent directory of the vnode for "/a/b/c" returns the vnode of "/a/b", and a lookup operation on the parent directory of the vnode for "/a/b"

returns the vnode of "/a", which is indicated as being a root node of the local file system. In FIG. 6B, the vnode for "/a/b/c" indicates that it is a root node of a file system, and the type of file system that includes vnodes 602 and 604 can be discovered with reference to VFS data structure 612.

However, FIG. 6B differs from FIG. 6A in that the mounted file system is an automounted file system. In the vnode/VFS interface, if a file system is an automounted file system, then a special file resource termed the "automount point" is instantiated. The root of the automount file system, e.g., "/c", is mounted over the automount point; in other words, the file system that supports "/c/d" is automounted onto the file system that supports "/a/b" while including an additional file system resource.

The presence of the automounted file system is reflected in the tree that is shown in FIG. 6B; although mounted-over-vnode pointer 616 for VFS data structure 612 indicates that the represented NFS file system is included within a parent file system, mounted-over-vnode pointer 616 points to vnode data structure 650, which is a special vnode data structure that represents an automount point. Vnode data structure 650 represents a special resource for the automount point that is not apparent in the path between "/a/b" and "/c/d". Vnode data structure 650 has VFS pointer 652 that points to VFS data structure 654, which is identified as an automount file system by type value 656. Mounted-over-vnode pointer 658 for VFS data structure 654 indicates that the represented automounted NFS file system is mounted in the file system that is represented by VFS structure 628.

Given the background information on the vnode/VFS interface that is provided in FIGS. 2-6B, the problem that is solved by the present invention can be reiterated. Non-file-subsystem modules may have a need to access metadata information about file system resources. For example, a non-file-subsystem software module may need certain metadata information about a file system resource in order to verify access control parameters within security configuration parameters, and the metadata information might be available by performing a lookup operation on a vnode data structure that represents the file system resource of interest.

It is possible that the file system that contains a file system resource is supported in an automounted file system. An automounter program automatically mounts an automounted file system on demand or as-needed. However, as shown above in the examples of the vnode/VFS interface, the vnode data structure does not contain any information that indicates that the file system resource is within a file system which is currently unmounted and that the file system is an automount file system. Hence, a problem arises because the software module would use the vnode data structure that represents the file system resource of interest in its attempt to get the file metadata.

In other words, there may be situations in which the file system that contains the target file system resource has been unmounted, after which the software module that is trying to obtain the metadata information performs an operation in an attempt to get the metadata information, thereby causing the automounter program to mount the automounted file system. In these situations, the software module attempts to obtain file metadata about an unmounted automount file system resource without realizing that the file system resource is within a file system which is currently unmounted and that the file system is an automount file system. Depending upon the frequency of the operations by the software module, the software module may repeatedly cause the file system to become mounted again, thereby effectively creating a situation in which the file system is rarely in an unmounted state.

The present invention is a mechanism for providing the software module with information so that the software module does not inadvertently perform an operation that causes an unmounted automount file system resource to become mounted. With the present invention, the software module has a mechanism for identifying automount file system resources and a mechanism for identifying unmounted automount file systems. Using the present invention, the software module can check that the file system is an automount file system and/or that the file system resource is within a file system which is currently unmounted, thereby allowing the software module to postpone its attempt to obtain the file metadata. The present invention helps to prevent situations in which an automount file system is repeatedly and unnecessarily remounted because it is likely that the software module does not need to perform any operations with respect to file system resources in unmounted file systems.

It should be noted that the present invention may be implemented in a variety of manners. The present invention may be implemented as a unique software module that is invoked by other software modules, or the present invention may be implemented as software code that is embedded within another software module to create an enhanced software module with the additional capabilities of the present invention. Referring again to FIG. 2, the present invention may be implemented as a unique software module that is logically grouped with non-file-subsystem modules 208 or that is logically grouped with file subsystem modules 210. Alternatively, the present invention may be implemented as software code that is embedded within one of the non-file-subsystem modules 208 and/or within one of the file subsystem modules 210. As the present invention is employed, it creates information that indicates that the file system is an automount file system and/or that the file system resource is within a file system which is currently unmounted. Depending upon the manner in which the present invention is implemented, this newly created information may be stored in local data structures 212 of non-file-subsystem 208 and/or within vnode/VFS data structures 216 of file system modules 210; in the latter case, the newly created information could be stored within the processing flags of the vnode data structure that represents the file system resource of interest, thereby effectively changing the vnode/VFS interface.

It should be noted that the process that is depicted within FIG. 7 or within FIG. 8 hereinbelow would be executed while an automount file system remains in a mounted state, in other words, after the automount file system is mounted but before the automount file system is unmounted. Given the fact that an automount file system tends to remain mounted for a minimum amount of time before being unmounted, a few assumptions can be made.

With respect to the file system resource of interest, i.e. the target file system resource, the process that is depicted within FIG. 7 or within FIG. 8 hereinbelow may be executed soon after a file system is mounted; for example, the process may be triggered by an event notification or signal that indicates that a file system has been recently mounted, thereby causing a software module or similar entity to initiate the process. Alternatively, a software module or similar entity may operate such that it processes information about file system resources on a relatively frequent basis. Thus, the software module or similar entity may be able to assume that the file system that contains the target file system resource will remain in a mounted state for a certain amount of time after discovery or identification of the target file system resource by the software module. Therefore, the software module or similar entity can assume that it has enough time to initiate the process before the file system that contains the target file system resource becomes unmounted.

Figure 7:
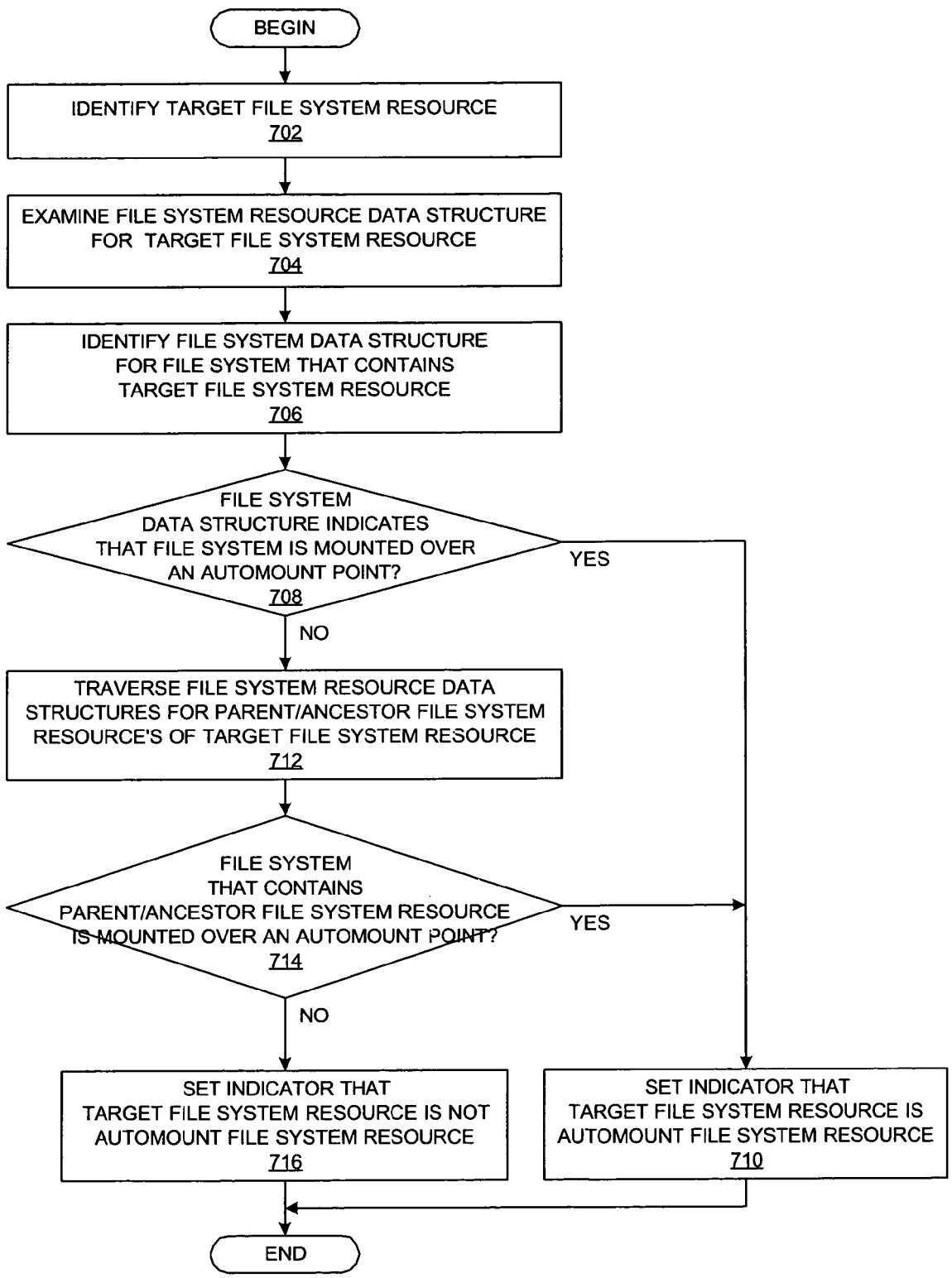
FIG. 7 depicts a flowchart that shows a process for determining whether a file system resource is contained within an automount file system, i.e. whether a file system resource is an automount file system resource, in accordance with an embodiment of the present invention.

With reference now to FIG. 7, a flowchart depicts a process for determining whether a file system resource is contained within an automount file system, i.e. whether a file system resource is an automount file system resource, in accordance with an embodiment of the present invention. The process that is shown in FIG. 7 differs from the process that is shown in FIG. 8; the flowchart in FIG. 7 depicts a process that operates on generic data structures that are not necessarily vnode/VFS data structures, e.g., within an operating system that does not support a vnode/VFS interface yet operates in a similar manner, whereas the flowchart in FIG. 8 depicts a process that operates on vnode/VFS data structures.

Referring now to FIG. 7, the process commences by identifying a target file system resource, e.g., a data file, a directory, or some other type of virtual file (step 702). A file system resource data structure that represents the target file system resource is examined (step 704), and a file system data structure that represents the file system that contains the target file system resource is identified using the file system resource data structure that represents the target file system resource (step 706). The file system data structure is then examined to determine if the file system is mounted over an automount point (step 708); in other words, the file system data structure is examined to determine if the file system data structure identifies a file system resource data structure that represents an automount point. If so, then a data value is stored that indicates that the target file system resource is an automount file system resource (step 710), and the process is concluded.

If it is not determined that the file system is mounted over an automount point at step 708, then additional file system resource data structures are traversed while examining them for a file system resource data structure that represents an automount point. The file system resource data structures that represent hierarchically more inclusive file system resources of the target file system resource are traversed (step 712), i.e. the parent file system resource of the target file system resource and continuing up a hierarchy with additional ancestor file system resources of the target file system resource, e.g., a directory or folder that contains another directory or folder that contains the target file; eventually, the "/" root node would be reached. A determination is made as to whether a file system that contains a parent/ancestor file system resource is mounted over an automount point (step 714); in other words, a determination is made as to whether a file system data structure that represents a file system that contains a parent/ancestor file system resource identifies a file system data structure that represents an automount point. If so, then a data value is stored that indicates that the target file system resource is an automount file system resource at step 710, and the process is concluded. If not, then a data value is stored that indicates that the target file system resource is not an automount file system (step 716), and the process is concluded.

Figure 8:
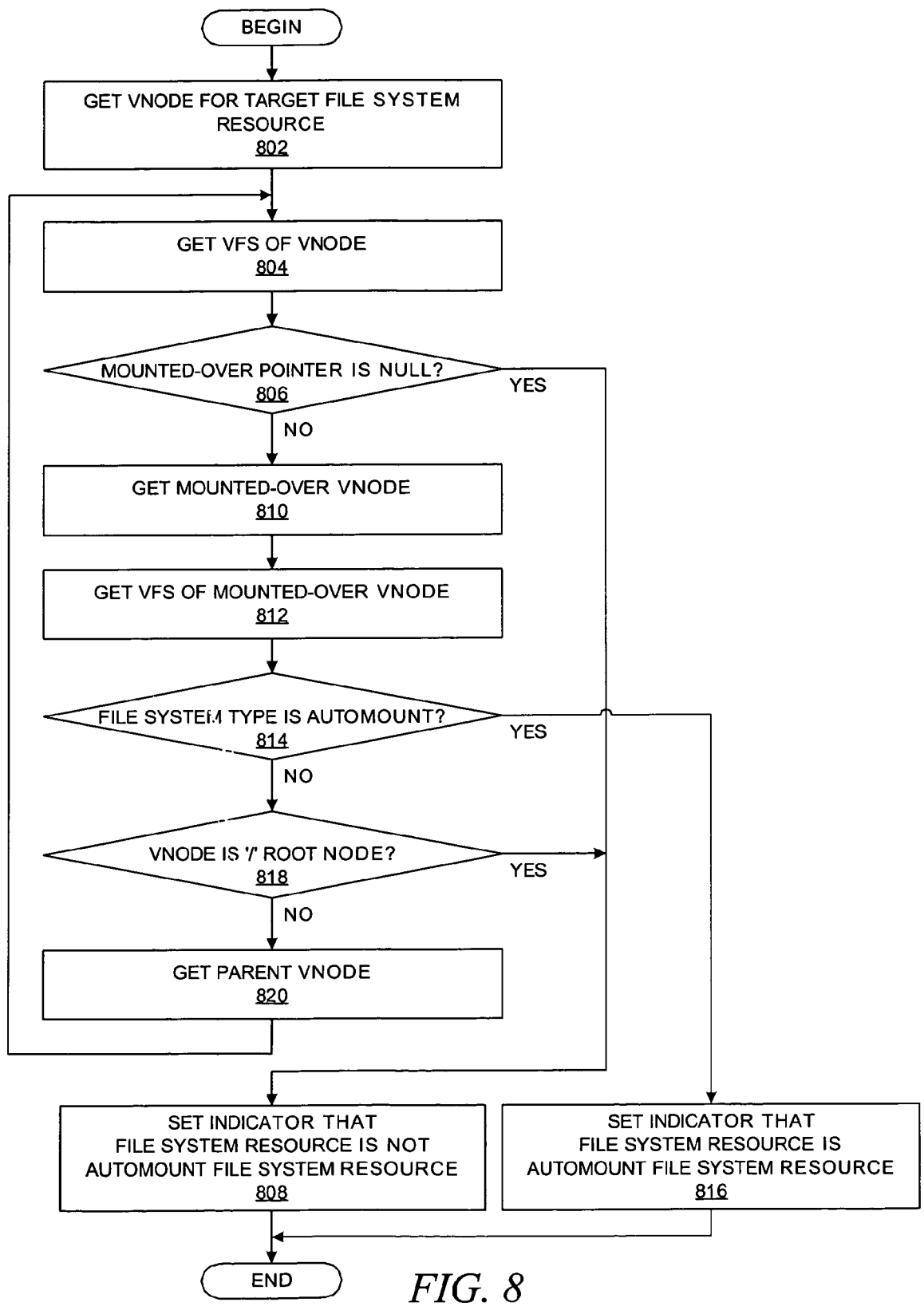
FIG. 8 depicts a flowchart that shows a process for determining whether a file system resource is contained within an automount file system using vnode/VFS data structures in accordance with an embodiment of the present invention.

With reference now to FIG. 8, a flowchart depicts a process for determining whether a file system resource is contained within an automount file system using vnode/VFS data structures in accordance with an embodiment of the present invention. The process commences by obtaining the vnode data structure of the file system resource of interest, i.e. the target file system resource (step 802). At this point, the vnode data structure that represents the target file system resource is the vnode that is currently being processed; hereinbelow, the vnode that is currently being processed at any given point in time is regarded as the current vnode. Using the pointer to the VFS data structure within the current vnode data structure, the VFS data structure of the current vnode is retrieved (step 804). A determination is made as to whether the mounted-over pointer in the retrieved VFS data structure is equal to a null value (step 806). If so, a data value is set to indicate that the target file system resource is not an automount file system resource (step 808), and the process is concluded. The process concludes at this point because if the mounted-over pointer is a null value, then the file system associated with the VFS data structure is the root file system, and it is not possible that the target file system is contained within another hierarchically more inclusive file system that is an automount file system.

If the mounted-over pointer in the retrieved VFS data structure is not equal to a null value at step 806, then the vnode data structure for the vnode over which the file system is mounted, i.e. the mounted-over vnode, is retrieved (step 810). Using the pointer to the VFS data structure within the mounted-over vnode's vnode data structure, the VFS data structure of the mounted-over vnode is retrieved (step 812). A determination is made as to whether the VFS data structure of the mounted-over vnode indicates that the file system that is represented by the VFS data structure is an automount file system (step 814); the VFS data structure contains a data field that indicates the type of file system, e.g., type "autofs". If so, a data value is set to indicate that the target file system resource is an automount file system resource because it is contained within an automount file system resource (step 816), and the process is concluded.

If the VFS data structure of the mounted-over vnode does not indicate that the file system that is represented by the VFS data structure is an automount file system at step 814, then a determination is made as to whether or not the mounted-over vnode represents the "/" root vnode of the file system (step 818), i.e. the root vnode of the root file system. If so, a data value is set to indicate that the target file system resource is not an automount file system resource at step 808 because it is not contained within an automount file system, and the process is concluded. Otherwise, the parent vnode of the mounted-over vnode is retrieved (step 820), e.g., using a lookup operation, and the retrieved parent vnode is then used as the current vnode of the process. The process then loops back to step 804 to perform another iteration to continue looking for an automount point. The parent vnodes represent parent file system resources of the target file system resource within the vnode/VFS data structures. At some point, an automount point is encountered or the root vnode of the root file system is encountered, thereby concluding the process.

Figure 9:
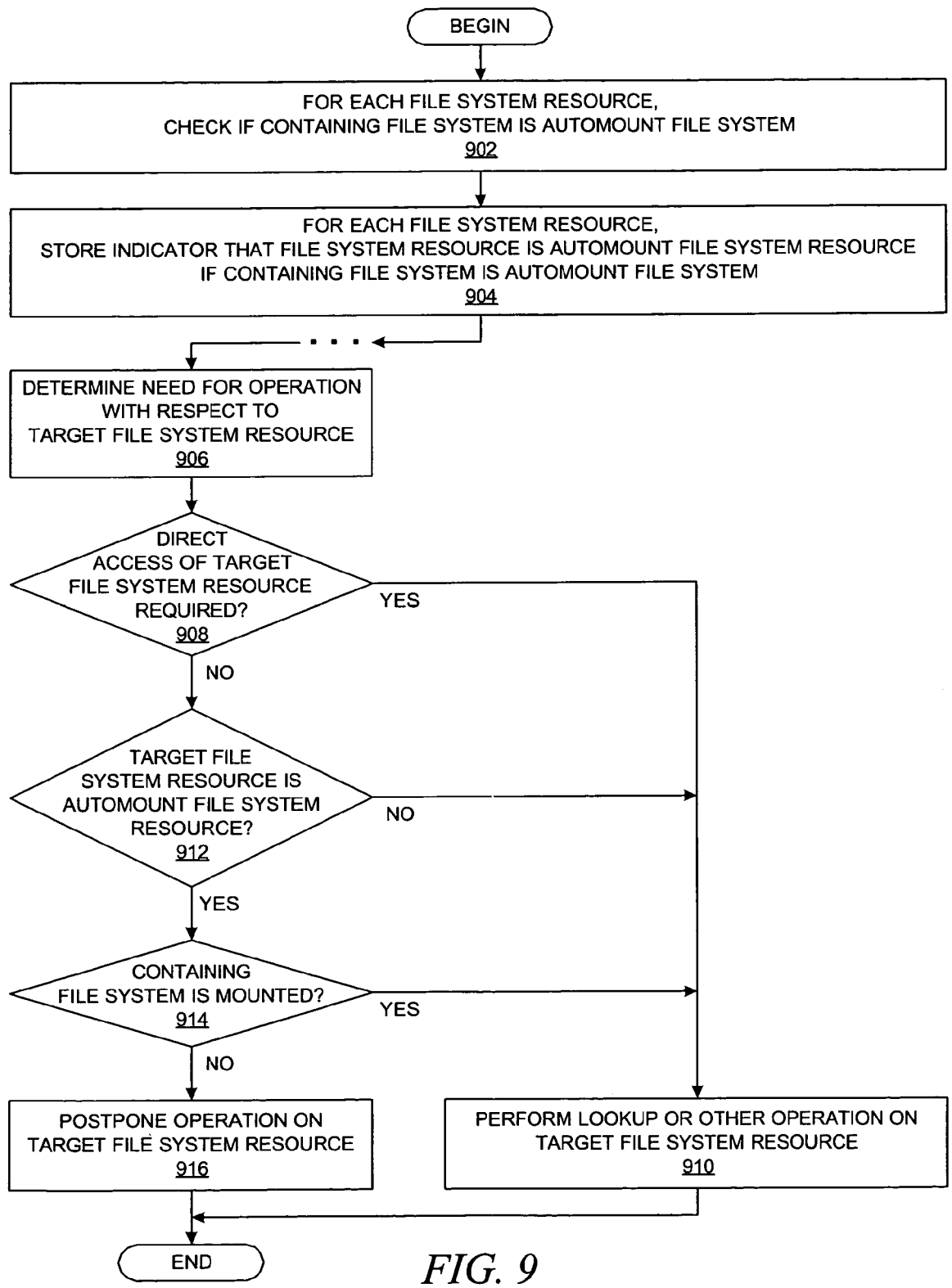
FIG. 9 depicts a flowchart that shows a process in which a kernel module avoids inadvertent remounting of an automount file system in accordance with an embodiment of the present invention.

While the process that is shown in FIG. 7 or FIG. 8 determines whether a file system resource is an automount file system resource, an embodiment of the present invention can incorporate this process as part of a larger process to prevent unnecessary mounting of automount file system resources. FIG. 9 depicts an embodiment in which the process that is shown in FIG. 7 or FIG. 8 fits into a larger context of use, as explained hereinbelow in more detail.

As mentioned above, a kernel module may need to monitor or maintain information about file system resources, e.g., a security module that needs to verify some type of file metadata information to enforce an access policy on file system resources. Automount file system resources can be automatically removed from the file system without a warning to the interested kernel module, e.g., if an automount file system resource is not accessed for a period of time. In the prior art, the kernel module would act without regard to whether a target file system resource is an automount file system resource or whether a file system that contains a target file system resource is mounted.

With the present invention, the kernel module can be extended with enhanced code or with access to enhanced code so that it can tolerate the automatic unmounting of a file system such that it does not cause inadvertent remounting of an automount file system. In order to do so, the present invention provides a method for checking whether a file system is mounted using file system data structures. In particular, file system operations, such as lookup operations on file system resources, are avoided if direct access to a file system resource is not required and/or the containing file system is not mounted.

With reference now to FIG. 9, a flowchart depicts a process in which a kernel module avoids inadvertent remounting of an automount file system in accordance with an embodiment of the present invention. The process commences by checking, for each target file system resource, if the containing file system is an automount file system (step 902). A data value is stored in association with each target file system resource that indicates that the target file system resource is an automount file system resource if the containing file system is an automount file system (step 904). Steps 902 and 904 may be performed when an interested kernel module discovers the need to manage information with respect to a target file system resource, when a file system resource data structure is instantiated to represent a target file system resource, or at some other point in time while the containing file system is mounted. In this manner, the subprocess that is shown in steps 902 and 904 are reduced versions of the process that is shown in FIG. 7 or in FIG. 8. This subprocess may be considered together with the subprocess that is described with respect to the remainder of FIG. 9, thereby forming a larger context in which the related subprocesses are used together to accomplish the goals of the present invention for solving a prior art problem.

Referring again to FIG. 9, at some later point in time after the completion of steps 902 and 904, the process determines a need to perform some type of file system operation with respect to a target file system resource (step 906). A determination is made as to whether or not direct access of the target file system resource is required by the kernel module (step 908). If so, then the desired operation, such as a lookup operation or other file system operation, is performed on the target file system resource (step 910), and the process is concluded. In other words, if the kernel module requires direct access of the target file system resource, the file system that contains the target file system resource would need to be mounted in order to obtain the required direct access to the target file system resource, so the additional checks that are shown in the flowchart are not performed because there is no need to avoid an inadvertent remounting of an unmounted automount file system.

If it is determined that direct access to the target file system resource is not required at step 908, then the desired file system operation could be assumed to be related to file metadata about the target file system resource. A determination is then made as to whether the target file system resource is an automount file system resource (step 912); step 912 can be performed by checking an indicating value that has been previously stored in association with other information about the target file system resource, e.g., as is done in the subprocess at steps 902 and 904. If not, then the desired file system operation is performed at step 910, and the process is concluded; in this case, since the target file system resource is not an automount file system resource, it is not possible to inadvertently remount a file system that was previously automatically unmounted.

If it is determined at step 912 that the target file system resource is an automount file system resource, then a determination is made as to whether the automount file system that contains the target file system resource is currently mounted (step 914). If so, then the desired file system operation is performed at step 910, and the process is concluded; in this case, since the containing file system is already mounted, it is not possible to inadvertently remount a file system that was previously automatically unmounted.

If it is determined at step 914 that the containing file system for the target file system resource is not currently mounted, then the desired file system operation to obtain the file metadata about the target file system resource is postponed until some later point in time (step 916), and the process is concluded; the postponement may be accomplished in a variety of manners, for example, by scheduling some type of software timer that signals the expiration of a waiting period, by marking a data structure with a special flag that indicates that the desired file system operation has been postponed, or in some other manner. If the process that is shown in FIG. 9 is performed by a different software module on behalf of an interested kernel module, e.g., in response to a system call, remote procedure call, function or procedure call, etc., then a status value might be returned to the interested kernel module in which the status value indicates the outcome of the determinations in FIG. 9 such that the interested kernel module then performs the desired file system operation.

Figure 10:
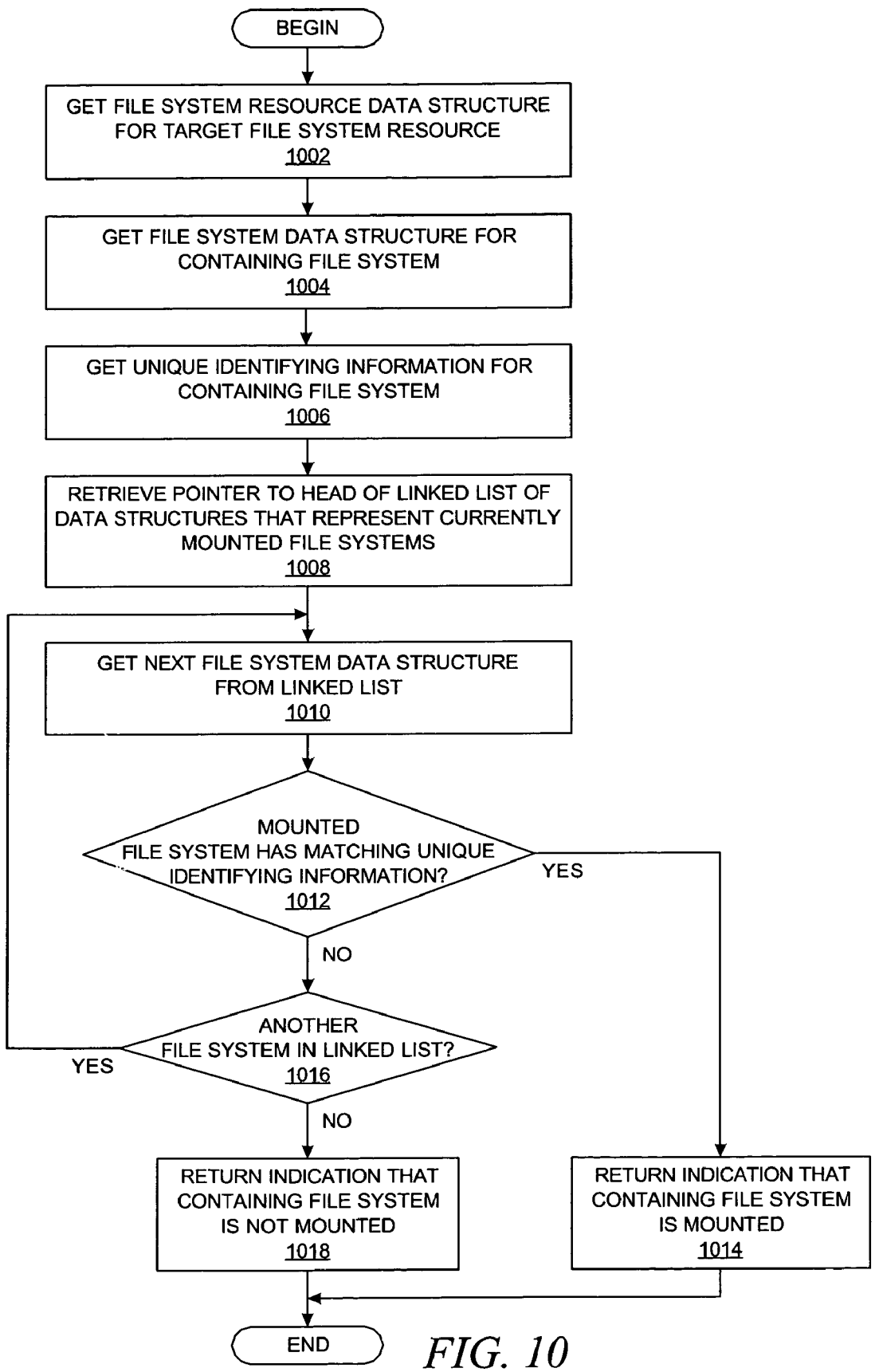
FIG. 10 depicts a flowchart that shows a process in which additional detail is provided for determining whether an automount file system is currently mounted in accordance with an embodiment of the present invention.

With reference now to FIG. 10, a flowchart depicts a process in which additional detail is provided for determining whether an automount file system is currently mounted in accordance with an embodiment of the present invention. In particular, FIG. 10 provides additional detail for step 914 that is shown in FIG. 9. The process commences by retrieving a file system resource data structure that represents the target file system resource (step 1002), from which the process retrieves the pointer to the file system data structure that represents the file system that contains the target file system resource, i.e. the containing file system (step 1004). Using the retrieved file system data structure, the unique identifying information for the containing file system is retrieved (step 1006). The process then retrieves the pointer to the head of a linked list of data structures that represent currently mounted file systems (step 1008); a kernel-level module maintains this linked list or some other data structure for containing a list of currently mounted file systems.

With the containing file system's unique identifying information and the linked list of currently mounted file systems, the process can loop through the linked list while examining the data structures within the linked list for information that matches the containing file system's unique identifying information. The next file system data structure is retrieved from the linked list (step 1010), and a determination is made as to whether the retrieved file system data structure contains information that matches the unique identifying information of the containing file system (step 1012). If so, then the containing file system is mounted because it is represented within the linked list of currently mounted file systems, and a status value is returned that indicates that the containing file system is mounted (step 1014), thereby concluding the process.

If the retrieved file system data structure does not contain unique identifying information that matches the unique identifying information of the containing file system, then the process attempts to perform another iteration. A determination is made as to whether the linked list contains another file system data structure (step 1016), and if so, then the process branches back to step 1010 to examine another file system data structure. If the linked list does not contain another file system data structure, then the end of the linked list has been encountered; a status value is returned that indicates that the containing file system is not mounted (step 1018), and the process is concluded.

Figure 11:
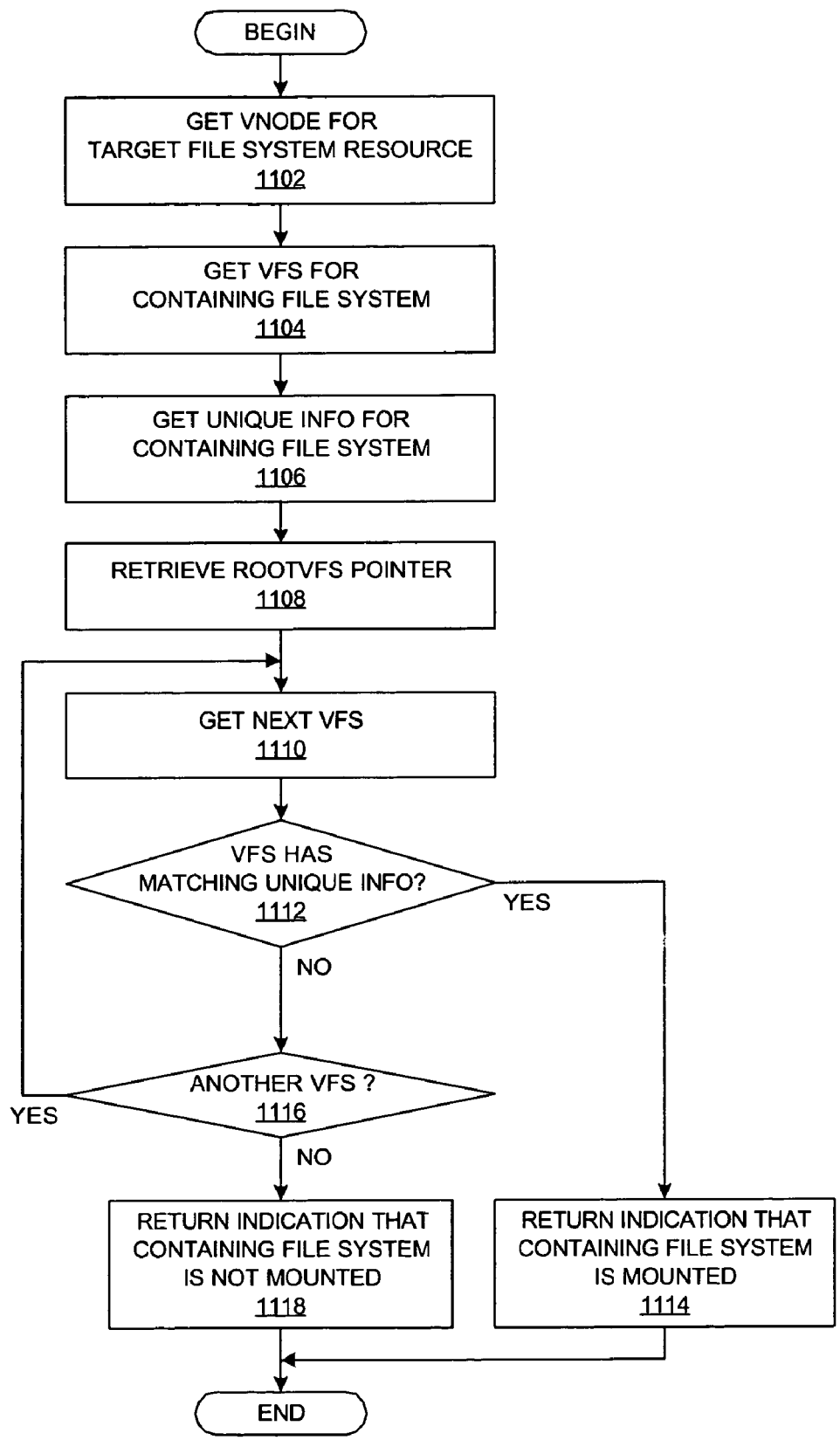
FIG. 11 depicts a flowchart that shows a process in which additional detail is provided for determining whether an automount file system is currently mounted within a system supported by a kernel with a vnode/VFS interface in accordance with an embodiment of the present invention.

With reference now to FIG. 11, a flowchart depicts a process in which additional detail is provided for determining whether an automount file system is currently mounted within a system supported by a kernel with a vnode/VFS interface in accordance with an embodiment of the present invention. The process that is shown in FIG. 11 is similar to the process that is shown in FIG. 10 in that they both provide additional detail for step 914 that is shown in FIG. 9. However, the process that is shown in FIG. 11 differs from the process that is shown in FIG. 10 in that the flowchart in FIG. 10 depicts a process that operates on generic data structures that are not necessarily vnode/VFS data structures, e.g., within an operating system that does not support a vnode/VFS interface yet operates in a similar manner, whereas the flowchart in FIG. 11 depicts a process that operates on vnode/VFS data structures.

Referring now to FIG. 11, the process commences by retrieving a vnode data structure that represents the target file system resource (step 1102), from which the process retrieves the pointer to the VFS data structure that represents the file system that contains the target file system resource, i.e. the containing file system (step 1104). Using the retrieved VFS data structure, the unique identifying information for the containing file system is retrieved (step 1106). The process then retrieves the rootVFS pointer, which points to the head of a linked list of VFS structures (step 1108); the kernel maintains this linked list as a list of currently mounted file systems.

The process then loops through the linked list while examining the VFS data structures for information that matches the containing file system's unique identifying information. The next VFS data structure is retrieved from the linked list (step 1110), and a determination is made as to whether the retrieved VFS data structure contains information that matches the unique identifying information of the containing file system (step 1112). If so, then a status value is returned that indicates that the containing file system is mounted (step 1114), thereby concluding the process.

If the retrieved VFS data structure does not contain unique identifying information that matches the unique identifying information of the containing file system, then a determination is made as to whether the linked list contains another VFS data structure (step 1116), and if so, then the process branches back to step 1010 to examine another VFS data structure. If the linked list does not contain another VFS data structure, then the end of the linked list has been encountered, and a status value is returned that indicates that the containing file system is not mounted (step 1118), and the process is concluded.

The advantages of the present invention should be apparent in view of the detailed description that is provided above. With the present invention, the kernel module can be extended with enhanced code or with access to enhanced code so that it can tolerate the automatic unmounting of a file system such that it does not cause inadvertent remounting of an automount file system. In order to do so, the present invention provides a method for checking whether a file system resource is an automount file system resource or whether an automounted file system resource is mounted. In particular, file system operations, such as lookup operations on file system resources, are avoided if direct access to a file system resource is not required and/or the containing file system is not mounted.

It is important to note that while the present invention has been described in the context of a fully functioning data processing system, those of ordinary skill in the art will appreciate that the processes of the present invention are capable of being distributed in the form of instructions in a computer readable storage medium and a variety of other forms. Examples of a computer readable storage medium include EPROM, ROM, tape, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer program product stored on a computer-readable storage medium having instructions embodied thereon for processing information about file system resources on a data processing system that supports a kernel that implements file system operations on file system resources, the computer program product comprising:

instructions for identifying by a first kernel-level process a file system resource for which the first kernel-level process requires to perform a file system operation;

instructions for retrieving by the first kernel-level process unique identifying information for a file system that contains the file system resource, wherein the file system is accessible through the kernel, and wherein a second kernel-level process manages a data structure having an entry for each file system that the kernel recognizes as being currently mounted;

instructions for obtaining access to the data structure by the first kernel-level process;

instructions for retrieving an automount indicator value for the file system resource;

instructions for searching the data structure by the first kernel-level process for an entry having information that matches the unique identifying information in response to a determination that the automount indicator value indicates that the file system that contains the file system resource is an automount file system;

instructions for determining if the file system operation requires direct access to the file system resource in response to finding an entry having information that matches the unique identifying information;

instructions for determining by the first kernel-level process whether the file system is mounted in response to a determination that the file system operation does not require direct access to the file system resource;

instructions for performing the file system operation in response to a determination by the first kernel-level process that the file system is mounted; and instructions for postponing the file system operation in response to a determination by the first kernel-level process that the file system is not mounted.

2. The computer program product of claim 1 further comprising:
instructions for performing the file system operation with respect to the file system resource without performing the step of searching the data structure in response to a determination that the automount indicator value indicates that the file system that contains the file system resource is not an automount file system.

3. The computer program product of claim 1 further comprising:
instructions for performing the file system operation with respect to the file system resource without performing the step of searching the data structure in response to a determination that direct access of the file system resource is required for the file system operation.

4. The computer program product of claim 1 wherein each entry in the data structure is a VFS (virtual file system) data structure.

5. An apparatus for processing information about file system resources on a data processing system that supports a kernel that implements file system operations on file system resources, the apparatus comprising:
a bus;
a storage device connected to the bus, wherein the storage device contains computer usable code; and
a processing unit connected to the bus, wherein the processing unit executes the computer usable code to identify by a first kernel-level process a file system resource for which the first kernel-level process requires to perform a file system operation; retrieve by the first kernel-level process unique identifying information for a file system that contains the file system resource, wherein the file system is accessible through the kernel, and wherein a second kernel-level process manages a data structure having an entry for each file system that the kernel recognizes as being currently mounted; obtain access to the data structure by the first kernel-level process; retrieve an automount indicator value for the file system resource; search the data structure by the first kernel-level process for an entry having information that matches the unique identifying information in response to a determination that the automount indicator value indicates that the file system that contains the file system resource is an automount file system; determine if the file system operation requires direct access to the file system resource in response to finding an entry having information that matches the unique identifying information; determine by the first kernel-level process that the file system is mounted in response to a determination that the file system operation does not require direct access to the file system resource; perform the file system operation in response to a determination by the first kernel-level process that the file system is mounted; and postpone the file system operation in response to a determination by the first kernel-level process that the file system is not mounted.

6. The apparatus of claim 5,
wherein the processing unit further executes the computer usable code to perform the file system operation with respect to the file system resource without performing the step of searching the data structure in response to a determination that the automount indicator value indicates that the file system that contains the file system resource is not an automount file system.

7. The apparatus of claim 5,
wherein the processing unit further executes the computer usable code to perform the file system operation with respect to the file system resource without performing the step of searching the data structure in response to a determination that direct access of the file system resource is required for the file system operation.

8. The apparatus of claim 5 wherein each entry in the data structure is a VFS (virtual file system) data structure.

* * * * *